United States Patent [19]
Takeda

[11] Patent Number: 6,166,718
[45] Date of Patent: Dec. 26, 2000

[54] VIDEO GAME SYSTEM WITH VERTICAL ARRAY OF CURSOR IMAGES

[75] Inventor: Takashi Takeda, Tokyo, Japan

[73] Assignee: Konami Co., Ltd., Hyogo-ken, Japan

[21] Appl. No.: 08/872,558

[22] Filed: Jun. 10, 1997

[30] Foreign Application Priority Data

Jun. 18, 1996 [JP] Japan .................................... 8-178511

[51] Int. Cl.[7] .............................................. G09G 5/08
[52] U.S. Cl. ........................................ 345/145; 345/139
[58] Field of Search ................................... 345/156, 157, 345/139, 145

[56] References Cited

U.S. PATENT DOCUMENTS

| | | | |
|---|---|---|---|
| 5,162,779 | 11/1992 | Lumelsky et al. ....................... | 345/139 |
| 5,654,726 | 8/1997 | Mima et al. .............................. | 345/145 |
| 5,771,036 | 6/1998 | Martin et al. ............................ | 345/145 |
| 5,801,704 | 9/1998 | Oohara et al. ........................... | 345/145 |
| 5,850,213 | 12/1998 | Imai et al. ............................... | 345/139 |
| 5,929,841 | 7/1999 | Fujii ........................................ | 345/145 |

FOREIGN PATENT DOCUMENTS 2238215  5/1991  United Kingdom .

OTHER PUBLICATIONS

Hudson S E: "Adding Shadows to a 3D Cursor", ACM Transactions on Graphics, US, Association for Computing Machinery, New York, vol. 11, No. 2, Apr. 1992 (1992–04), p. 193–199 XP000287426, ISSN: 0730–0301 *p. 194, line 4 –line 13* *p. 199, line 3 –line 15*.

*Primary Examiner*—Matthew Luu
*Attorney, Agent, or Firm*—Jordan and Hamburg LLP

[57] ABSTRACT

A cursor is displayed in a three-dimensionally displayed field as a plurality of cursor images three-dimensionally in a vertical array in the field. A plurality of different types of cursor images may be prepared as each of said cursor images, and displayed as each of said cursor images. Positions where at least selected ones of the cursor images are displayed may be changed in every predetermined period of time. The cursor images may be changed in shape as a viewpoint with respect to the field is changed in position.

18 Claims, 13 Drawing Sheets

FIG. 3A

| x (HORIZONTAL) | z (DEPTH) | y (HEIGHT) |
|---|---|---|
| 0 | 0 | yy |
| --- | --- | --- |
| xx | zz | yy |

FIG. 3B

| x | z | y | CHARACTER FLAG | SETTING ENERGY | PRESENT ENERGY | ACTION FLAG |
|---|---|---|---|---|---|---|
| 0 | 0 | yy | 0 | 100 | 50 | 1 |
| --- | --- | --- | --- | --- | --- | --- |
| xx | zz | yy | 1 | 200 | 30 | 0 |

FIG. 3C

| VIEWPOINT ADDRESS | LINEAR DISPLACEMENT | ANGULAR DISPLACEMENT |
|---|---|---|
| --- | --- | --- |

F I G. 4
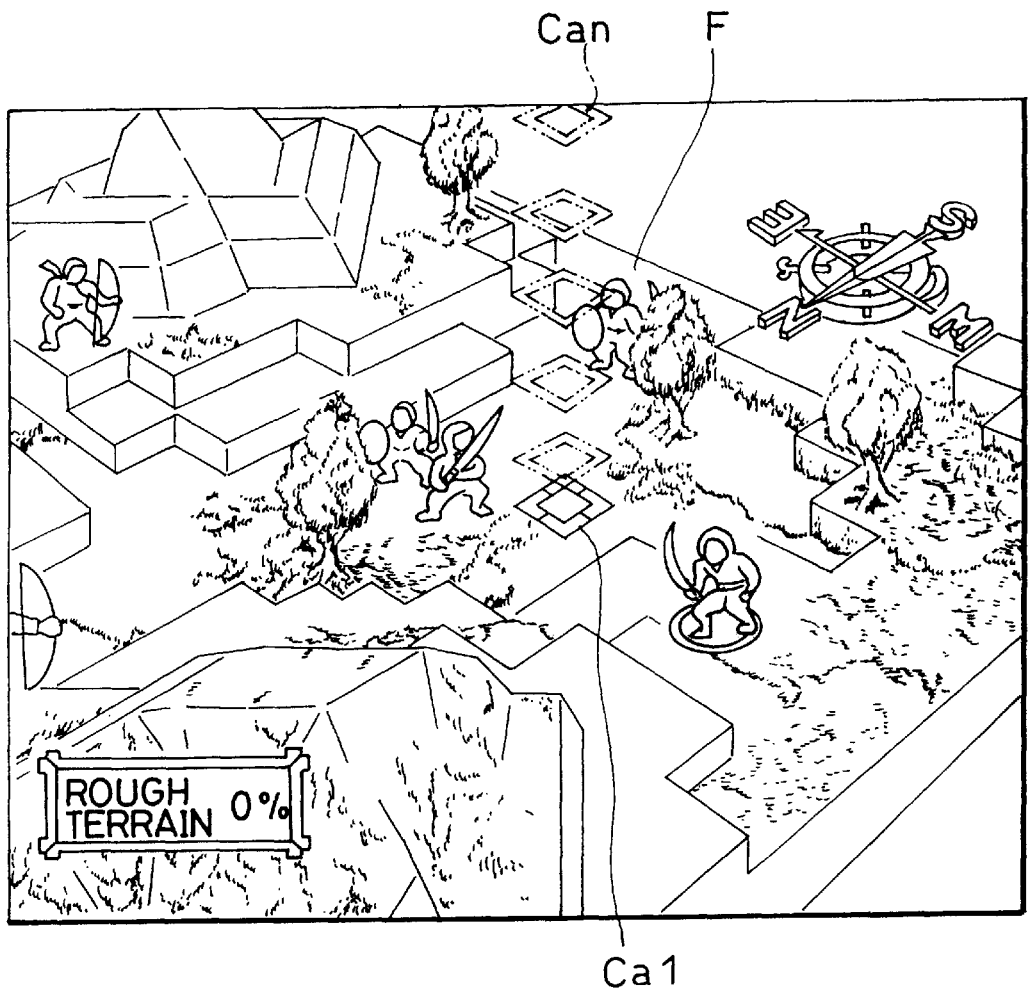

VIDEO GAME SYSTEM WITH VERTICAL ARRAY OF CURSOR IMAGES

BACKGROUND OF THE INVENTION

1. Field of the Invention

The present invention relates to a video game which operates according to game program data stored in a recording medium such as an optical disk, a magnetic disk, a cassette with a built-in semiconductor memory, or the like, and more particularly to a method of displaying a cursor associated with a vertical array of cursor images in a three-dimensionally displayed game field, a video game system with a cursor displayed with a vertical array of cursor images in a three-dimensionally displayed game field, and a recording medium which stores game program data for displaying a cursor in association with a vertical array of cursor images in a three-dimensionally displayed game field.

2. Description of the Prior Art

Various video game systems which have been proposed in the art include video game systems comprising a combination of a video game machine designed for home use and a television monitor, video game systems designed as video game machines for business use, and video game systems comprising a combination of a personal computer or work station, a display unit, and an audio output unit. These video game systems commonly comprise a controller which can manually be operated by a game player, a recording medium which stores game data including game program data, graphic image data, and audio data, a central processing unit (CPU) for performing a control process based on the game program data to generate video data and audio data, a graphic processor for generating graphic images to be displayed, an audio processor for generating sounds to be outputted, a cathoderay tube (CRT) for displaying graphic images, and a speaker for outputting sounds. The recording medium may typically be a CD-ROM, a semiconductor memory, a cassette with a built-in semiconductor memory, or the like.

Video games that can be played on video game systems are available in a growing number of different types, and their rules are rapidly becoming more complex and diverse. One particular kind of video games which have been proposed in many different forms allows the game player to move the position of a game character of its own on a game field with a controller to fight with a game character controlled by the computer of the video game system, so that the game characters wage a battle in a game space displayed on the display screen of a television monitor.

In video games where game characters fight a battle with each other in a displayed game space, the game player is required to select a desired game character to be moved in the game space as instructed by the game player. Usually, a game character is selected with arrow keys on a controller and a cursor displayed on a game field and movable by the arrow keys.

There have been demands from users of such video games for three-dimensional display of game fields.

When a game field is displayed three-dimensionally, however, the position of the cursor may not be identified occasionally. For example, if the cursor is positioned behind a bump in the game field, then the cursor cannot be seen through the bump.

SUMMARY OF THE INVENTION

It is therefore an object of the present invention to provide a video game system which allows a displayed cursor on a three-dimensionally displayed game field to be clearly identified.

According to an aspect of the present invention, there is provided a method of displaying a cursor in a three-dimensionally displayed field, comprising the step of displaying a plurality of cursor images three-dimensionally in a vertical array in the field.

According to another aspect of the present invention, there is provided a method of displaying a cursor in a three-dimensionally displayed field, comprising the steps of setting a three-dimensional coordinate value of a selected position in the field, setting a plurality of three-dimensional coordinate values based on the three-dimensional coordinate value, and supplying two-dimensional coordinate values obtained from the three-dimensional coordinate values for displaying a plurality of cursor images three-dimensionally in the field.

According to still another aspect of the present invention, there is provided a video game system comprising a controller manually operable by a game player, display means for displaying a field and a cursor three-dimensionally, a recording medium storing game program data, and control means, controllable by the game program data, for setting a three-dimensional coordinate value of a selected position in the field, setting a plurality of three-dimensional coordinate values based on the three-dimensional coordinate value, and supplying two-dimensional coordinate values obtained from the three-dimensional coordinate values for displaying a plurality of cursor images three-dimensionally in the field.

According to yet still another aspect of the present invention, there is provided a recording medium storing game program data for pointing to an object in a three-dimensionally displayed field, setting a three-dimensional coordinate value of a selected position in the field, setting a plurality of three-dimensional coordinate values based on the three-dimensional coordinate value, and supplying two-dimensional coordinate values obtained from the three-dimensional coordinate values for displaying a plurality of cursor images three-dimensionally in the field.

The above and other objects, features, and advantages of the present invention will become apparent from the following description when taken in conjunction with the accompanying drawings which illustrate a preferred embodiment of the present invention by way of example.

BRIEF DESCRIPTION OF THE DRAWINGS

FIG. 3A is a diagram showing a table of data of a game field;

FIG. 3B is a diagram showing a table of data indicative of the positions and states of game characters in the game field;

FIG. 3C is a diagram showing a table of address data of the vertexes of polygons which make up the game field depending on the position of a viewpoint and data of angular and linear displacements;

FIGS. 4 through 7 are views showing by way of examples images that are displayed on the display screen of a television monitor of the video game system;

DETAILED DESCRIPTION OF THE PREFERRED EMBODIMENT

A combat video game typically played on a video game system according to the present invention is first described below. In the combat video game, a number of game characters of both sides are displayed in a displayed combat field. A game player of the combat video game can move his game characters with arrow keys of a controller. The game player can issue commands to the game characters of its own to attack the enemy game characters that confront the game characters of its own. Each of the player's game characters is assigned an energy value corresponding to the personality thereof. When the energy value of a game character becomes nil, the game character is removed from the combat field. In order to clear a combat field, it is necessary for the game characters of the game player to defeat the leader of the enemy. The combat video game ends when the leader on the side of the game player is defeated by the enemy.

Figure 1:
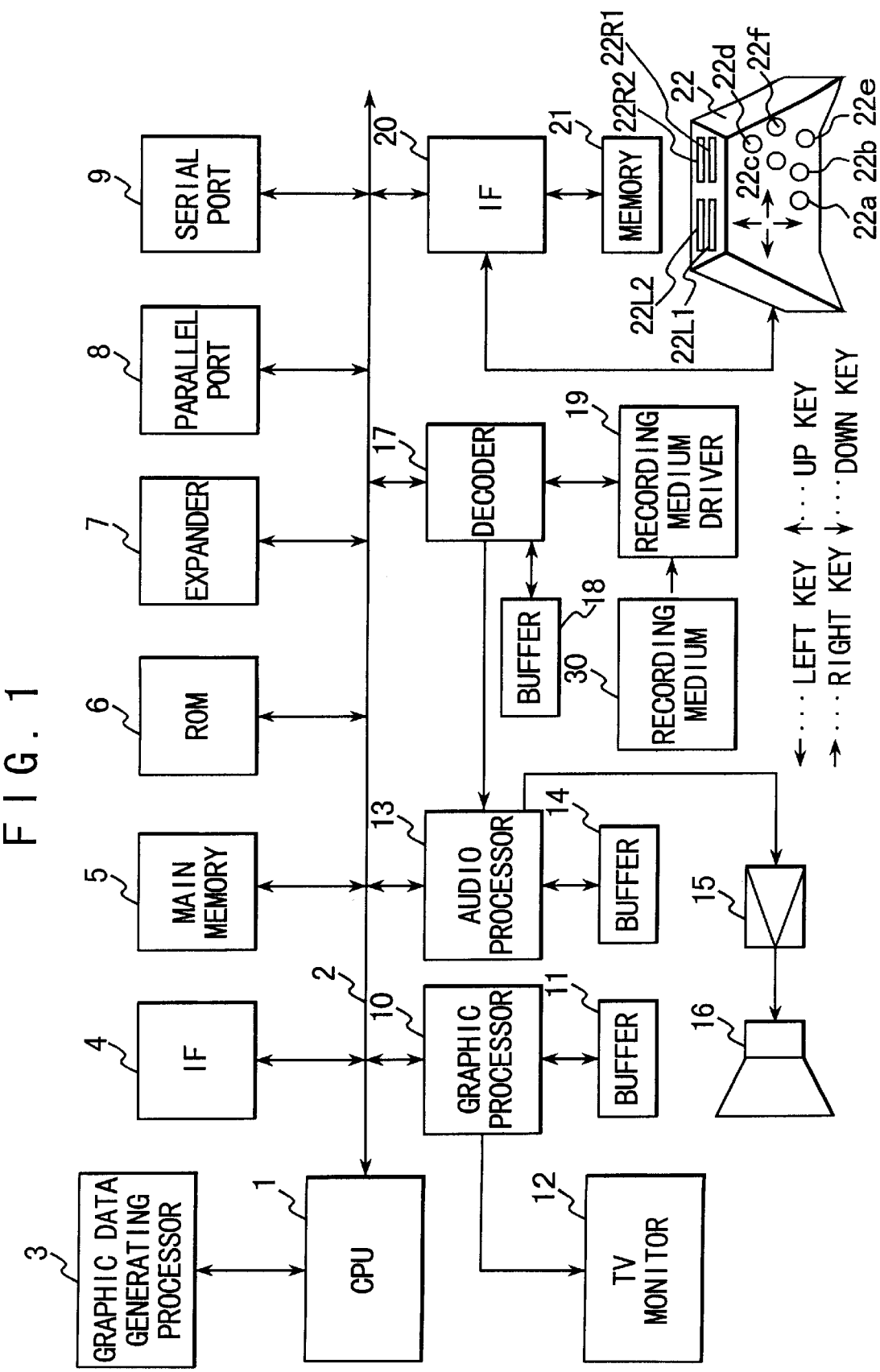
FIG. 1 is a block diagram of a video game system according to the present invention.

FIG. 1 shows in block form the video game system according to the present invention. As shown in FIG. 1, the video game system generally comprises a game machine assembly and a recording medium 30 which stores game program data, graphic image data, and audio data. The game machine assembly comprises a CPU 1, a bus 2 connected to the CPU 1 and comprising an address bus, a data bus, and a control bus, an interface 4 connected to the bus 2, a main memory 5 connected to the bus 2, a read-only memory (ROM) 6 connected to the bus 2, an expander 7 connected to the bus 2, a parallel port 8 connected to the bus 2, a serial port 9 connected to the bus 2, a graphic processor 10 connected to the bus 2, a buffer 11 connected to the graphic processor 10, a television monitor 12 connected to the graphic processor 10, an audio processor 13 connected to the bus 2, a buffer 14 connected to the audio processor 13, an amplifier 15 connected to the audio processor 13, a speaker 16 connected to the amplifier 15, a decoder 17 connected to the bus 2, a buffer 18 connected to the decoder 17, a recording medium driver 19 connected to the decoder 17, an interface 20 connected to the bus 2, a memory 21 connected to the interface 20, and a controller 22 connected to the interface 20. The recording medium 30 is set in the recording medium driver 19.

The video game system may take different system configurations depending on the manner in which it is used. If the video game system is used as a video game system for home use, for example, then the television monitor 12 and the speaker 16 are separate from the other parts of the game machine assembly. If the video game system is used as a video game system for business use, for example, then all the parts shown in FIG. 1 are assembled as a unit and encased in a single housing. If the video game system is constructed around a personal computer or a work station, then the television monitor 12 corresponds the display monitor of the computer, the graphic processor 10, the audio processor 13, and the expander 7 correspond to part of the game program data stored in the recording medium 30 or a hardware arrangement on an expansion board inserted in an expansion slot of the computer, and the interface 4, the parallel port 8, the serial port 9, and the interface 20 correspond to a hardware arrangement on an expansion board inserted in an expansion slot of the computer. The buffers 11, 14, 18 correspond to respective areas of the main memory 5 or an expansion memory (not shown). In the illustrated embodiment, the video game system is described as a video game system for home use.

The various parts of the video game system shown in FIG. 1 are described below. The graphic data generating processor 3 serves as a coprocessor of the CPU 1. The graphic data generating processor 3 carries out coordinate transformations, light source calculations, and processing matrixes and vectors of fixed point by way of parallel processing. Main processing tasks of the graphic data generating processor 3 are coordinate transformations and light source calculations. According to the coordinate transformations, absolute coordinate data of vertexes in a two- or three-dimensional plane of image data supplied from the CPU 1 are processed to determine addresses of an image in a display area based on linear and angular displacement data, and the determined addresses are returned to the CPU 1. The coordinate transformations will be described in detail later on. According to the light source calculations, the luminance of an image is calculated depending on vector data of light rays, normal data representing the orientation of the surface of a polygon, and data representing the color of the surface.

The interface 4 serves as an interface for use with a peripheral device such as a pointing device such as a mouse, a track ball, or the like. The ROM 6 stores game program data as an operating system for the video game system. The game program data in the ROM 6 correspond to a BIOS (Basic Input Output System) in a personal computer.

The expander 7 serves to expand graphic image data compressed by an intracoding process according to the MPEG (Moving Pictures Experts Group) standard and the JPEG (Joint Photographic Experts Group) standard. Expanding processes carried out by the expander 7 include a decoding process for decoding data encoded by a VLC (Variable Length Coding) process, an inverse quantizing process, an IDCT (Inverse Discrete Cosine Transform) process, and a decoding process of decoding intracoded images, among others.

The graphic processor 10 effects a graphic processing on data contained in the buffer 11 based on graphic commands issued from the CPU 1. The buffer 11 has a display area and a non-display area. The display area is an area for storing data to be displayed on the display screen of the television monitor 12, and the non-display area is an area for storing texture data, color palette data, etc. The texture data are two-dimensional image data. The color palette data are data for indicating colors of the texture data. These data are transferred beforehand from the recording medium 30 to the non-display area of the buffer 11 by the CPU 1 in one cycle or a plurality of cycles in synchronism with the progress of the video game.

Graphic commands issued from the CPU 1 include, for example, a graphic command for displaying a line, a graphic command for displaying a three-dimensional image using polygons, and a graphic command for displaying an ordinary two-dimensional image. Polygons are polygonal two-dimensional images which may be of a triangular or rectangular shape.

The graphic command for displaying a line comprises addresses for starting and ending displaying a line, and data representing the color of the line and the displaying of the line. The graphic command for displaying a line is issued from the CPU 1 directly to the graphic processor 10.

The graphic command for displaying a three-dimensional image using polygons comprises polygon vertex address data in the display area of the buffer 11, texture address data indicative of a storage position in the buffer 11 of texture data to be mapped onto polygons, color palette address data indicative of a storage position in the buffer 11 of color palette data representing a color of the texture data, and luminance data indicative of a luminance of the texture data. Of these data, the polygon vertex address data is calculated by the graphic data generating processor 3 based on polygon absolute coordinate data, polygon motion data, and viewpoint motion data from the CPU 1. The manner in which the polygon vertex address data is determined is described below.

Motion of an object on the display screen of the television monitor 12 is determined by the movement of the object itself and the movement of a viewpoint with respect to the object. For example, if only the object moves and the viewpoint is fixed, then the motion of the object on the display screen of the television monitor 12 is the same as the movement of the object itself. Conversely, if the object does not move and only the viewpoint moves, then the motion of the object on the display screen of the television monitor 12 is the same as the movement of the viewpoint itself. The above explanation can be understood more easily if the term "viewpoint" is replaced with a term "camera position". Therefore, the display screen of the television monitor 12 displays the object thereon as if the object were imaged by a moving camera. While either the object or the viewpoint has been described as moving in the above explanation, the data are processed and displayed as if both the object and the viewpoint were moving.

The motion of the object comprises an angular displacement and a linear displacement. The angular displacement of the object with respect to the viewpoint is generated by rotation angles of the object and the viewpoint. The angular displacement and the rotation angles are expressed by 2×2 matrices in a data processing which uses a two-dimensional coordinate system and 3×3 matrices in a data processing which uses a three-dimensional coordinate system. The linear displacement of the object with respect to the viewpoint is generated by an object position (coordinates), a viewpoint position (coordinates), and a rotation angle of the viewpoint. The rotation angle is expressed by 2×2 matrices in a data processing which uses a two-dimensional coordinate system and 3×3 matrices in a data processing which uses a three-dimensional coordinate system. Rotation angles of the object and the viewpoint based on commands from the controller 22 are stored in tables. Based on a command from the controller 22, the CPU 1 reads corresponding rotation angles of the object and the viewpoint from the tables, and uses the read rotation angles to determine angular and linear displacements of the object with respect to the viewpoint.

Polygon vertex address data in the display area is determined as follows: In response to a command from the controller 22, the CPU 1 determines a rotation angle and a position of the object and a rotation angle and a position of the viewpoint. Based on the determined rotation angles of the object and the viewpoint, the CPU 1 determines an angular displacement of the object with respect to the viewpoint. Based on the position of the object and the position and rotation angle of the viewpoint, the CPU 1 determines a linear displacement of the object with respect to the viewpoint. If the angular and linear displacement data of the object are processed using a three-dimensional coordinate system, then they are expressed in 3×3 matrices.

The angular and linear displacement data of the object are supplied together with polygon absolute coordinate data to the graphic data generating processor 3. Based on the supplied angular and linear displacement data of the object, the graphic data generating processor 3 converts the polygon absolute coordinate data to polygon vertex address data. The polygon absolute coordinate data is obtained according to the above process.

The polygon vertex address data represents addresses in the display area of the buffer 11. The graphic processor 10 establishes a triangular or rectangular range in the display area of the buffer 11 which is represented by three or four polygon vertex address data, and writes texture data in the established range. Such a writing process is generally referred to as "texture mapping". The display screen of the television monitor 12 displays an object with texture data mapped onto a number of polygons which the object is constructed of.

The graphic command for displaying an ordinary two-dimensional image comprises vertex address data, texture address data, color palette address data, and luminance data indicative of a luminance of the texture data. Of these data, the vertex address data comprises coordinate data produced when vertex coordinate data in a two-dimensional space from the CPU 1 are transformed by the graphic data generating processor 3 based on linear displacement data.

The audio processor 13 stores ADPCM data read from the recording medium 30 in the buffer 14 and uses the ADPCM data stored in the buffer 14 as a sound source. The audio processor 13 reads the ADPCM data with a clock having a frequency of 44.1 kHz, for example, from the buffer 14. The audio processor 13 then processes the ADPCM data read from the buffer 14, for pitch conversion, noise addition, envelope setting, level setting, reverberation addition, etc. If audio data read from the recording medium 30 are PCM data, then the audio processor 13 converts the PCM data to ADPCM data. PCM data are processed by the video program data directly in the main memory 5. The PCM data processed in the main memory 5 are supplied to the audio processor 13, which converts the PCM data to ADPCM data, processes the ADPCM data as described above, and outputs the ADPCM data as sounds from the speaker 16.

The recording medium driver 19 may comprise a hard disk drive, an optical disk drive, a flexible disk drive, a silicon disk drive, a cassette reader, or the like, and the recording medium 30 may comprise a hard disk, an optical disk, a flexible disk, a semiconductor memory, or the like. The recording medium driver 19 reads graphic image data, audio data, and game program data from the recording medium 30, and supplies the read data to the decoder 17. The decoder 17 effects an error-correcting process on the data from the recording medium driver 19 with an ECC (Error-Correcting Code), and supplies the error-corrected data to the main memory 5 or the audio processor 13.

The memory 21 comprises a holder and a card-type memory. The card-type memory serves to hold various parameters of the game, e.g., to hold a game status when the game comes to an end.

The controller 22 has arrow keys including a left key L, a right key R, an up key U, and a down key D, a first left button 22L1, a second left button 22L2, a first right button 22R1, a second right button 22R2, a start button 22a, a select button 22b, a first button 22c, a second button 22d, a third button 22e, and a fourth button 22f. The arrow keys are used by the game player to give the CPU 1 commands indicative of upward, downward, leftward, and rightward directions. The start button 21a is used by the game player to instruct the CPU 1 to start the game program data loaded from the recording medium 30. The select button 22b is used by the game player to instruct the CPU 1 to make various selections relative to the game program data which are loaded from the recording medium 30 to the main memory 5. The first and second left keys 22L1, 22L2, the first and second right keys 22R1, 22R2, and the first—fourth buttons 22c, 22d, 22e, 22f have functions which differ depending on the game program data which are loaded from the recording medium 30.

Operation of the video game system will briefly be described below. When a power supply switch (not shown) of the video game system is turned on, the video game system is energized. If the recording medium 30 is inserted in the recording medium driver 19, then the CPU 1 instructs the recording medium driver 19 to read the game data from the recording medium 30 based on the operating system stored in the ROM 6. The recording medium driver 19 then reads the graphic image data, audio data, and game program data from the recording medium 30. The graphic image data, audio data, and game program data that are read are supplied to the decoder 17, which effects an error-correcting process on the supplied data. The error-corrected data are supplied through the bus 2 to the expander 7, which expands the data. The expanded data are then supplied to the graphic processor 10, and written in the non-display area of the buffer 11 by the graphic processor 10.

The audio data that have been error-corrected by the decoder 17 are supplied to the main memory 5 or the audio processor 13, and stored in the main memory 5 or the buffer 14. The game program data that have been error-corrected by the decoder 17 are supplied to and stored in the main memory 5. Subsequently, the CPU 1 executes the video game based on the game program data stored in the main memory 5 and commands entered into the controller 22 by the game player. Specifically, the CPU 1 controls image processing, audio processing, and internal processing operations based on commands entered into the controller 22 by the game player. In the image processing operation, angular and linear displacement data and absolute coordinate data are supplied to the graphic data generating processor 3, and graphic commands including address data in the display area of the buffer 11, determined by the graphic data generating processor 3, and luminance data are issued. In the audio processing operation, an audio output command is issued to the audio processor 13 and level, reverberation, and other settings are indicated. In the internal processing operation, calculations are carried out based on commands entered into the controller 22 by the game player.

Figure 2:
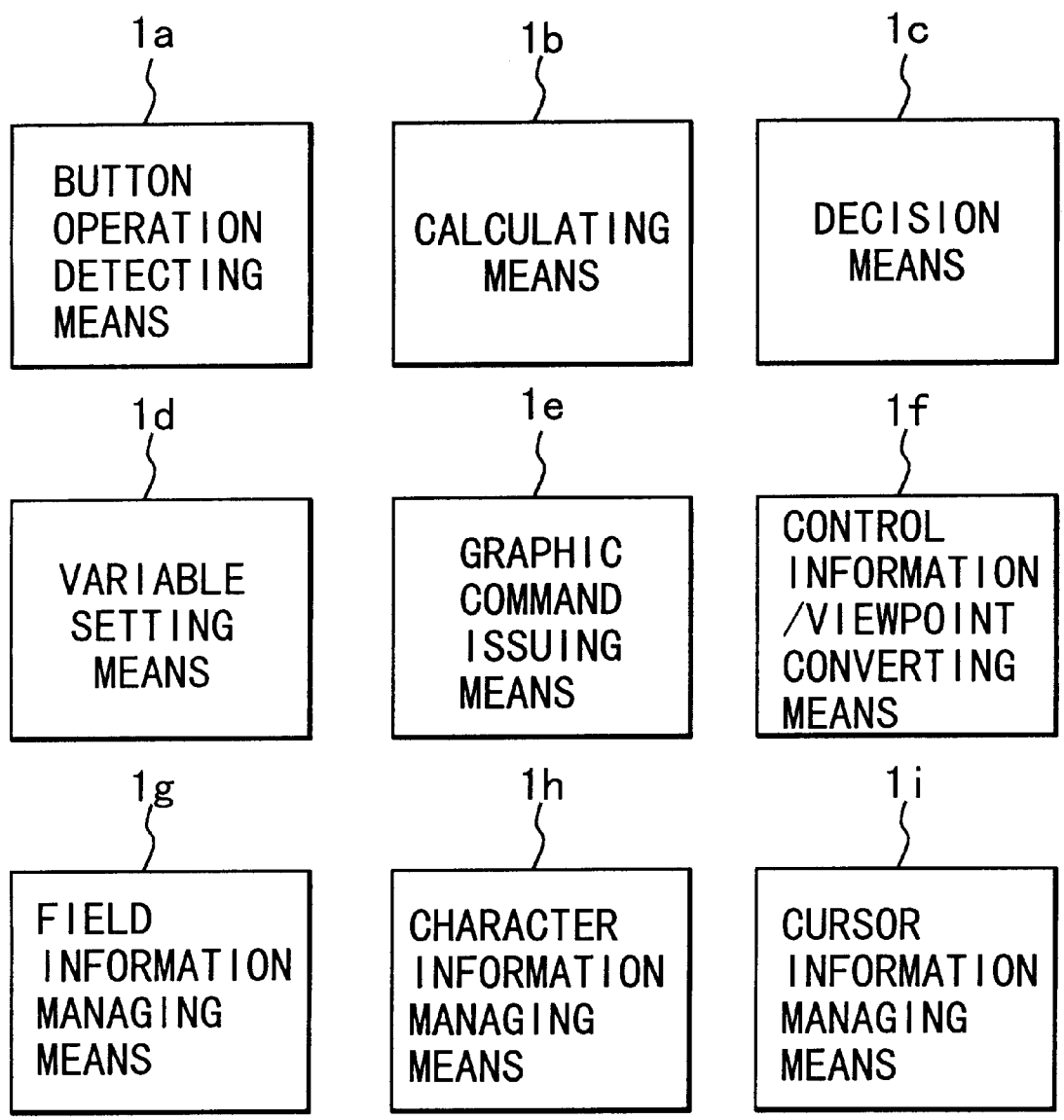
FIG. 2 is a block diagram showing functions performed by a CPU in the video game system shown in FIG. 1.

FIG. 2 shows functions performed or means operated by the CPU 1 to perform functions shown in FIG. 1. The CPU I performs the functions shown in FIG. 2 when it reads the game program data which have been read from the recording medium 30 and stored in the main memory 5. As shown in FIG. 2, the functions or means include a button operation detecting function or means 1a, a calculating function or means 1b, a decision function or means 1c, a variable setting function or means 1d, a graphic command issuing function or means 1e, a control information/viewpoint converting function or means 1f, a field information managing function or means 1g, a character information managing function or means 1h, and a cursor information managing function or means 1i. These functions or means serve as control functions or means in subsequent processes described below.

FIG. 3A shows a table of data of a game field. FIG. 3B shows a table of data indicative of the positions and states of game characters in the game field. FIG. 3C shows a table of address data of the vertexes of polygons which make up the game field depending on the position of a viewpoint and data of angular and linear displacements.

The table shown in FIG. 3A contains data representative of the heights of positions in the game field. The table data shown in FIG. 3A is read from the recording medium 30 and stored in the main memory 5.

The table shown in FIG. 3B contains data representative of the positions of game characters of both sides in the game field, a character flag indicating the game characters of the game player and the enemy, an action flag, setting energy, and present energy. The table data shown in FIG. 3B is read from the recording medium 30 and stored in the main memory 5. The table data stored in the main memory 5 are updated from time to time depending on the states of the game characters and the manner in which the video game develops.

The table shown in FIG. 3C contains data used to display the game field with polygons.

The character flag shown in FIG. 3B indicates whether a game character is present in a position indicated by an address (x, y). If a game character is present in a position indicated by an address (x, y), then the corresponding character flag is set to a high level "1." If a game character is not present in a position indicated by an address (x, y), then the corresponding character flag is set to a low level "0." The setting energy shown in FIG. 3B differs from game character type to game character type. During combat in the video game, a subtractive value which is generated randomly is subtracted from the setting energy. The present energy is present remaining energy of a game character. When the present energy of a game character is reduced to "0," the game character is regarded as being defeated, and removed from the game field. At this time, the character flag of the game character is set to "0." The action flag is a flag indicating whether a game character in a position indicated by an address (x, y) has finished its action or not. If the game character in a position indicated by an address (x, y) has finished its action, then the action flag is set to a high level "1." If the game character in a position indicated by an address (x, y) has not finished its action, then the action flag is set to a low level "0." The action signifies an attack, for example.

In the illustrated embodiment, the game field is displayed in polygons, and is moved depending on how the first left button 22L1, the second left button 22L2, the first right button 22R1, and the second right button 22R2 of the controller 22 are pressed. Specifically, when the first left button 22L1 is pressed, the game field is progressively rotated to in the leftward direction. When the second left button 22L2 is pressed, the game field is progressively rotated to in the right direction. When the first right button 22R1 is pressed, the game field is lifted at its side near the viewer, i.e., the game player, and lowered at its side remote from the viewer. When the second right button 22R2 is pressed, the game field is lifted at its side remote the viewer and lowered at its side near from the viewer. As the game field is thus moved, the shape of a cursor image is also changed.

When either one of the first left button 22L1, the second left button 22L2, the first right button 22R1, and the second right button 22R2 is pressed, the type of the pressed button and the number of times that it is pressed are converted to the position of a viewpoint. The table shown in FIG. 3C is used to obtain address data of absolute coordinate data of the vertexes of a polygon and data of angular and linear displacements from the main memory 5, using the data of the position of a viewpoint as an index. The absolute coordinate data (x, y, z) of the vertexes of a polygon and data of angular and linear displacements which are read from the main memory 5 are supplied to the graphic data generating processor 3 and used thereby as information for generating a graphic command.

FIGS. 4 through 7 show by way of examples images that are displayed on the display screen of the television monitor 12. In the illustrated embodiment, the game field is displayed three-dimensionally. If a cursor is positioned behind a bump in the game field that is displayed three-dimensionally, then the cursor is concealed by the bump, and its position cannot be ascertained. According to the present invention, a plurality of cursors are displayed three-dimensionally in a vertical array on the game field. The cursors that are thus displayed three-dimensionally in a vertical array on the game field allow the game player to recognize the position of the cursor when it is placed behind the bump.

FIG. 4 illustrates cursor images that are displayed three-dimensionally on the game field. As shown in FIG. 4, the cursor images include a white lozenged basic cursor image Cal displayed most closely to a game field F, and a number of semitransparent lozenged cursor images displayed in a vertical array above the cursor image Cal. The nth semitransparent lozenged cursor image, counted from below, positioned in an uppermost position, is denoted by Can. The cursor images are displayed as cursor images having different patterns for respective frames, such that the cursor images are visually perceived as being rotated in themselves. The addresses of the cursor images other than the basic cursor image Cal are varied for respective frames, such that these cursor images are displayed like a rising column of smoke. All the cursor images may be semitransparent, or may be displayed in a different position.

Figure 5:
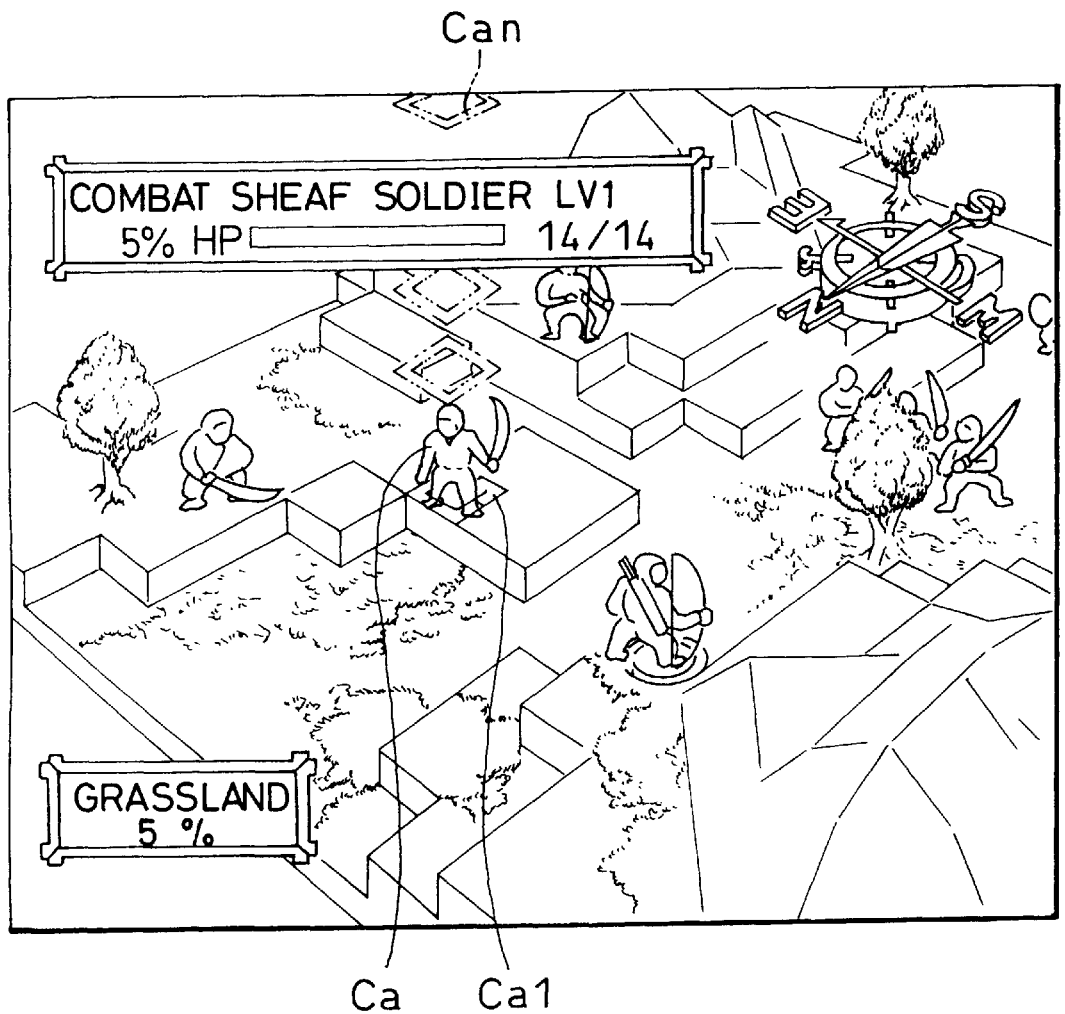
Figure 6:
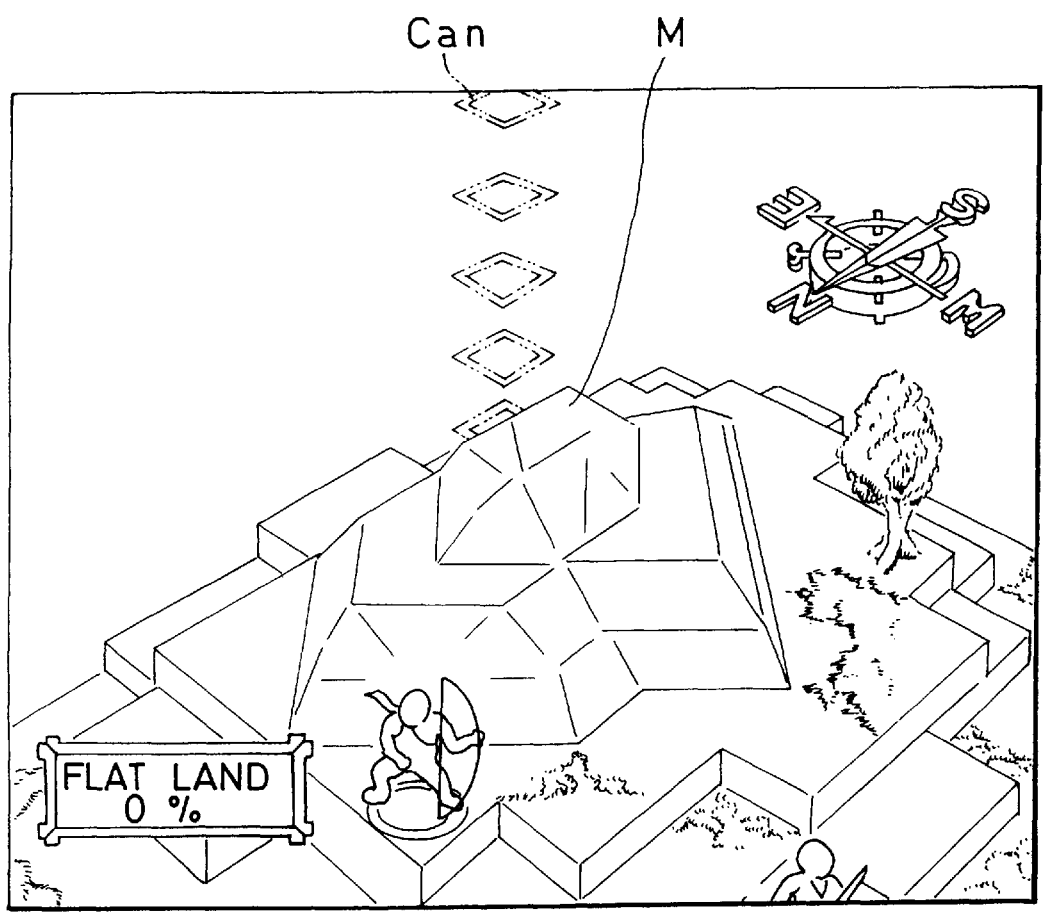
Figure 7:
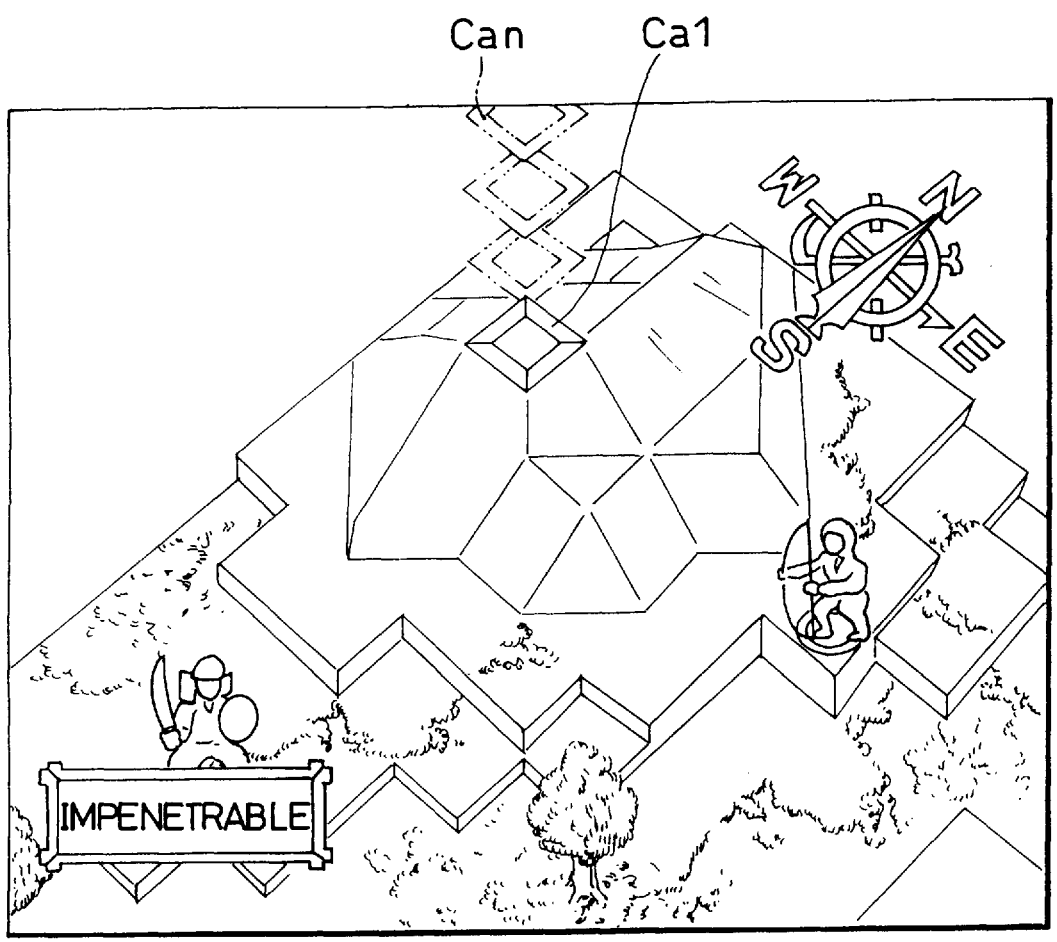

The cursor represented by the cursor images shown in FIG. 4 can be moved in the game field F with the arrow keys of the controller 22. FIG. 5 shows an image in which a character Ca is selected by the cursor image Cal. Since the cursor images Cal—Can are shaped like a rising column of smoke, the game player can recognize the position of the cursor image Ca even when the cursor image Ca is positioned behind a bump M (see FIG. 6), because the game player can see the cursor image Can and other cursor images displayed therebelow. The position of a viewpoint with respect to the game field F can be changed with the first left button 22L1, the second left button 22L2, the first right button 22R1, and the second right button 22R2. Stated otherwise, the game field F can be modified three-dimensionally in shape with the first left button 22L1, the second left button 22L2, the first right button 22R1, and the second right button 22R2. When the game field F is modified three-dimensionally in shape, as shown in FIG. 7, the cursor images Cal—Can are also modified in shape in response to operation of the first left button 22L1, the second left button 22L2, the first right button 22R1, and the second right button 22R2.

Figure 8:
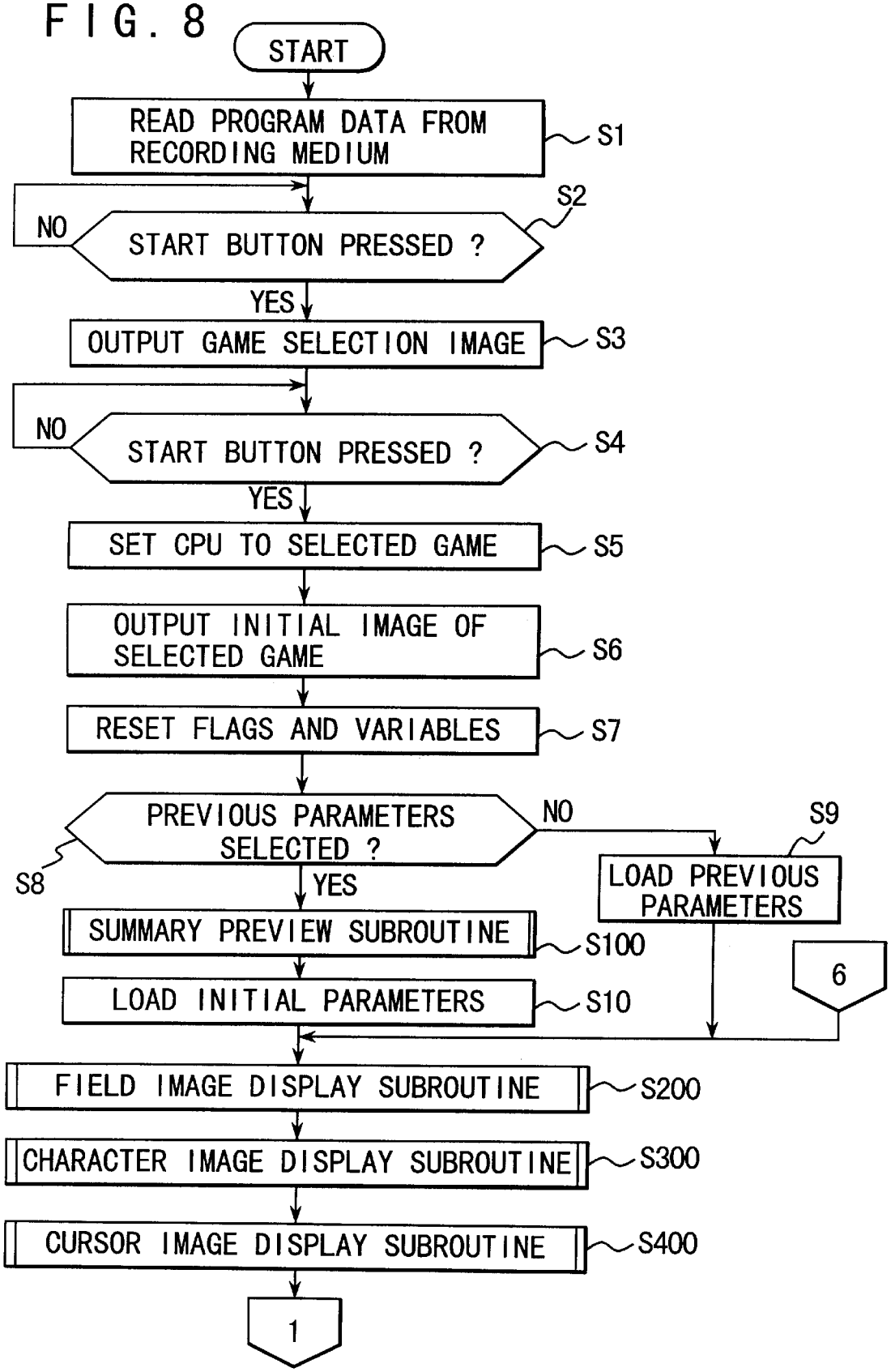
FIGS. 8 through 10 are flowcharts of a control sequence according to a main routine of a video game program which controls the video game system shown in FIG. 1.
Figure 9:
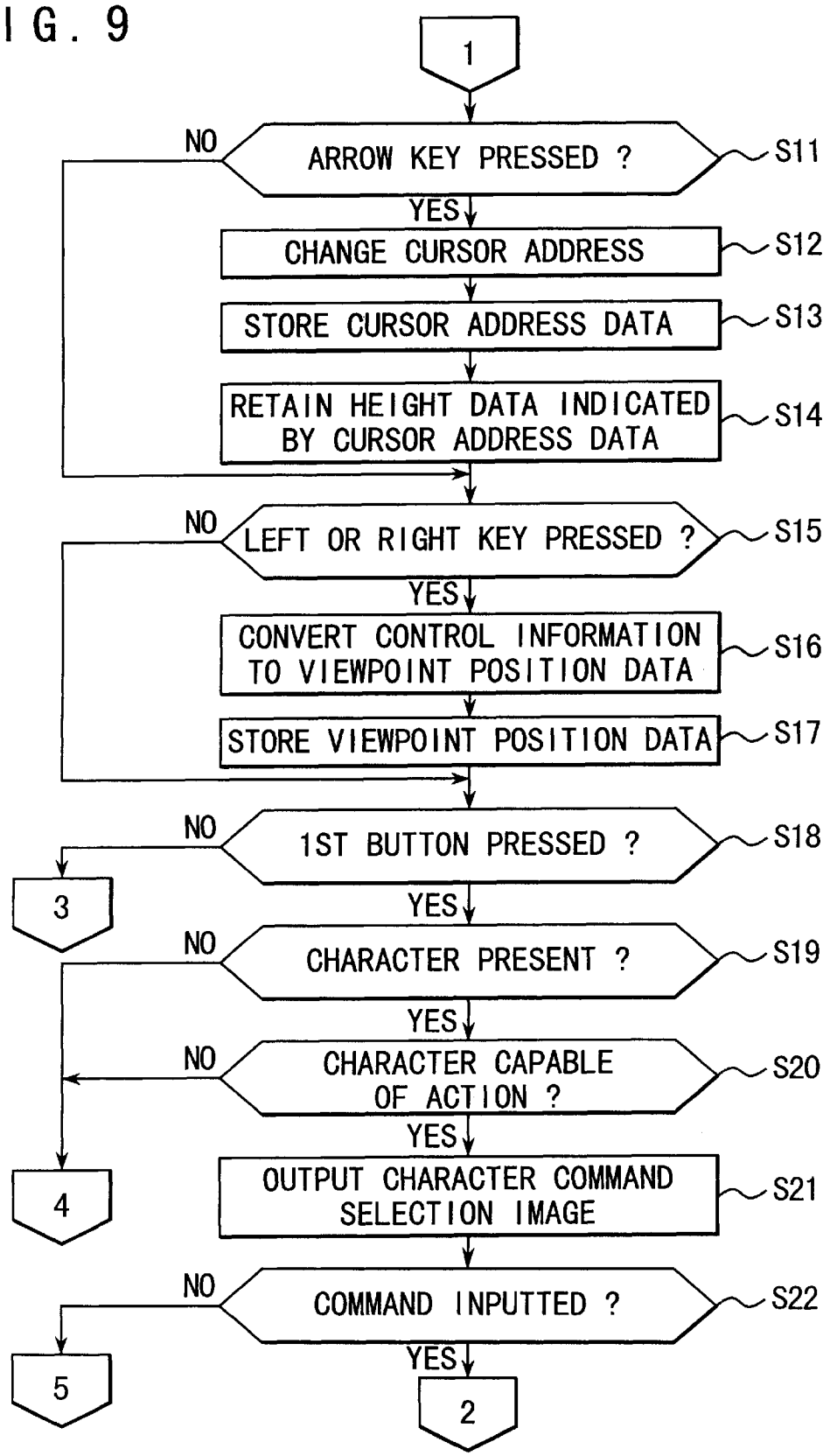
Figure 10:
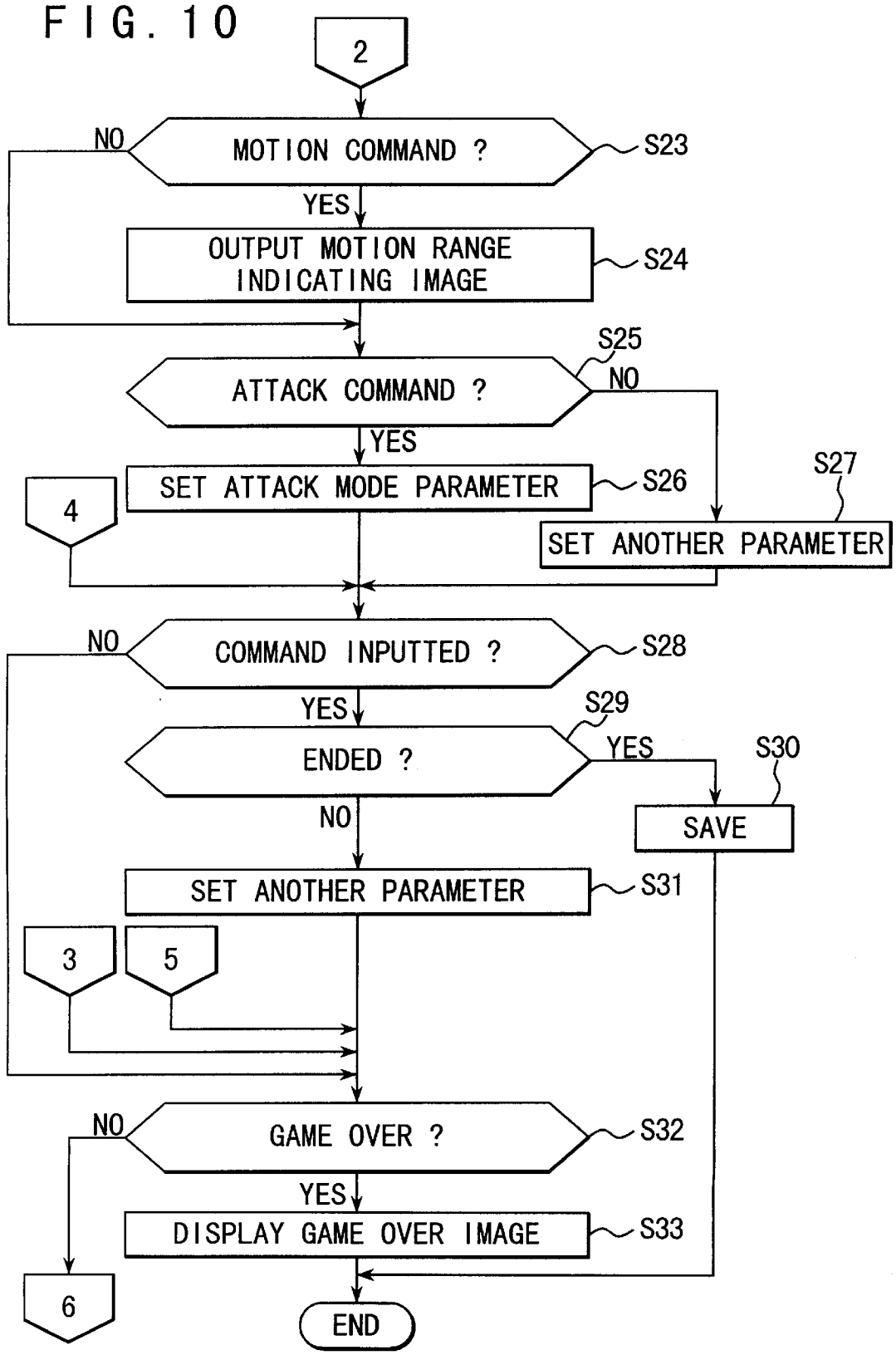

FIGS. 8 through 10 show flowcharts of a control sequence according to a main routine of a video game program which controls the video game system shown in FIG. 1.

The control sequence shown in FIG. 8 includes a step S1 which is executed by the operating system stored in the ROM 6 shown in FIG. 1, and other steps which are executed based on the game program data read from the recording medium 30. The steps based on the game program data are executed by the various functions or means of the CPU 1 as shown in FIG. 2.

As shown in FIG. 8, the operating system instructs the recording medium driver 19 to read graphic data, audio data, and game program data from the recording medium 30 in a step S1. Of the data read from the recording medium 30, the game program data are stored in the main memory 5, and imparts the functions or means shown in FIG. 2 to the CPU 1. The graphic data, i.e., texture data, are stored in the buffer 11 connected to the graphic processor 10, and are assigned respective texture data numbers. The audio data are stored in the buffer 14 connected to the audio processor 13, and are assigned respective audio data numbers. Usually, not all the graphic and audio data are stored in the buffers 11, 14 in the step S1. However, it is assumed for illustrative purposes that all the graphic and audio data are loaded from the recording medium 30 in the step S1.

In a step S2, the button operation detecting means 1a determines whether the start button 22a of the controller 22 has been pressed or not by the game player. If pressed (YES), then control proceeds to a step S3.

In the step S3, the graphic command issuing means 1g issues a graphic command for displaying a game selection image to the graphic processor 10. Based on the supplied graphic command, the graphic processor 10 stores graphic data of the game selection image in the display area of the buffer 11 and displays the game selection image on the display screen of the television monitor 12.

In a next step S4, the button operation detecting means 1a determines whether the start button 22a of the controller 22 has been pressed or not by the game player. If pressed (YES), then control proceeds to a step S5.

Before the start button 22a is pressed by the game player, the game player selects a desired video game, here a combat video game, on the game selection image using the arrow keys. After the game player has selected a desired video game, the game player presses the start button 22a. Of course, any of various other games that can be played on the video game system may be selected. For example, a new video game or a video game saved on a memory card may be selected.

In the step S5, it is assumed that a combat video game is selected as a new video game, the CPU 1 is set to the selected combat video game.

In a step S6, the graphic command issuing means 1g issues a graphic command for displaying an initial image of the selected game to the graphic processor 10. The graphic processor 10 stores graphic data of the initial image in the display area of the buffer 11 and displays the initial image on the display screen of the television monitor 12.

In a step S7, the variable setting means 1h resets flags and variables held in the main memory 5.

In a step S8, the decision means 1c determines whether previous parameters have been selected or not. If previous parameters have been selected (YES), then control proceeds to a step S100. If not (NO), then control goes to a step S9. The previous parameters are parameters stored in a memory card, and represent data for starting the video game from a previous state. For example, the previous parameters represent data (number data, etc.) for specifying a game field, table data shown in FIG. 3B, and other data.

In the step S9, the CPU 1 reads previous parameter data from the memory 21. After being read from the memory 21, the previous parameter data are stored into the main memory 5 through the interface 20 and the bus 2. The video game system is now set up according to the previous parameter data, so that the game player can start the video game continuously from the previous video game results.

In the step S100, a summary preview subroutine is executed. The summary preview subroutine displays summary images before the video game is actually started. The game player can go through the summary images by pressing the first button 22c. After the summary preview subroutine, the video game is actually started.

In a next step S10, the CPU 1 reads initial parameter data from the memory 21. The read initial parameter data are stored into the main memory 5 through the interface 20 and the bus 2. The video game system is now set up according to the initial parameter data, so that the game player can start the video game from the outset.

In a step S200, a field image display subroutine is executed. The field image display subroutine is described in detail further on.

In a step S300, a character image display subroutine is executed. In the character image display subroutine, game characters are displayed two-dimensionally. Several types of image patterns available for each of the game characters are displayed one after another in respective frames, for thereby making the game characters appear to move to the game player.

In a step S400, a cursor image display subroutine is executed. The cursor image display subroutine is described in detail further on.

In a next step S11 (see FIG. 9), the button operation detecting means 1a determines whether an arrow key is pressed by the game player or not. If an arrow key is pressed (YES), then control proceeds to a step S12. If not (NO), then control jumps to a step S15.

In the step S12, the cursor information managing means 1i changes cursor address data (x, z) stored in a cursor address retention area in the main memory 5.

In a step S13, the cursor information managing means 1i stores the cursor address data (x, z) in a cursor address storage area in the main memory 5.

In a step S14, the cursor information managing means 1i retains height data y indicated by the cursor address data (x, z) stored in the cursor address storage area in the main memory 5, in a height data retention area in the main memory 5.

In the step S15, the button operation detecting means 1a determines whether an either one of the first left button 22L1, the second left button 22L2, the first right button 22R1, and the second right button 22R2 is pressed by the game player or not. If an either one of these buttons is pressed (YES), then control proceeds to a step S16. If not (NO), then control jumps to a step S18. As described above, when an either one of the first left button 22L1, the second left button 22L2, the first right button 22R1, and the second right button 22R2 is pressed, the position of a viewpoint with respect to the cursor and the game field is changed. Stated otherwise, the cursor and the game field are changed in shape when an either one of these buttons is pressed.

In the step S16, the control information/viewpoint converting means 1f converts control information from the controller 22 to viewpoint position data.

In a step S17, the control information/viewpoint converting means 1f stores the viewpoint position data in the main memory 5. The stored viewpoint position data is used as an index for reading address data of absolute coordinate data of the vertexes of a polygon and data of angular and linear displacements from the main memory 5.

In the step S18, the button operation detecting means 1a determines whether the first button 22c is pressed by the game player or not. If the first button 22c is pressed (YES), then control proceeds to a step S19. If not (NO), then control jumps to the step S32.

In the step S19, the character information managing means 1h reads a character flag at a position indicated by the cursor address data (x, z) stored in the cursor address storage area in the main memory 5. Then, the decision means 1c determines whether the character flag is "1" or not. If the character flag is "1" (YES), then control goes to a step S20. If not (NO), then control jumps to a step S28.

In the step S20, the character information managing means 1h reads an action flag at a position indicated by the cursor address data (x, z) stored in the cursor address storage area in the main memory 5. Then, the decision means 1c determines whether the action flag is "0" or not. If the character flag is "0" (YES), then control goes to a step S21. If not (NO), then control jumps to the step S28.

In the step S21, the graphic command issuing means 1e outputs a graphic command for outputting a character command selection image to the graphic processor 10.

In a next step S22, the button operation detecting means 1a determines whether the controller 22 is operated. Then, the decision means 1c determines whether a command is inputted from the controller 22 or not. If a command is inputted from the controller 22 (YES), then control proceeds to a step S23. If not (NO), then control jumps to the step S32.

In the step S23, the decision means 1c determines whether the command represents "motion" or not. If the command represents "motion" (YES), then control proceeds to a step S24. If not (NO), then control jumps to a step S25.

In the step S24, the graphic command issuing means 1e outputs a graphic command for outputting a motion range indicating image to the graphic processor 10.

In the step S25, the decision means 1c determines whether the command represents "attack" or not. If the command represents "attack" (YES), then control proceeds to a step S26. If not (NO), then control goes to a step S27.

In the step S26, the variable setting means 1d sets a parameter for an attack mode. The parameter for the attack mode represents an attack capability or the like of a game character which will launch an attack.

In the step S27, the variable setting means 1d sets another parameter. The other parameter may be any of various parameters for an action other than the attack, e.g., hold, motion, defense, etc.

In the step S28, the button operation detecting means 1a determines whether the controller 22 is operated. Then, the decision means 1c determines whether a command is inputted from the controller 22 or not. If a command is inputted from the controller 22 (YES), then control proceeds to a step S29. If not (NO), then control jumps to the step S32.

In the step S29, the decision means 1c determines whether the command represents "end" or not. If the command represents "end" (YES), then control goes to a step S30. If not (NO), then control goes to a step S31.

In the step S30, the CPU 30 stores the parameter data stored in the main memory 5 into the memory 21. Then, the main routine comes to an end.

In the step S31, the variable setting means 1d sets another parameter. The other parameter may be any of various parameters other than the end.

In the step S32, the decision means 1c determines whether the video game is ended or not. If the video game is ended (YES), then control proceeds to a step S33. If not (NO), then control goes back to the step S200.

In the step S33, an image indicating that the video game is over is displayed.

In this embodiment, one cycle of the steps S200–S32 is executed in a period of time which is equal to one frame. The period of time of one frame is 1/30 second according to the NTSC system, and 1/25 second according to the PAL system.

Figure 11:
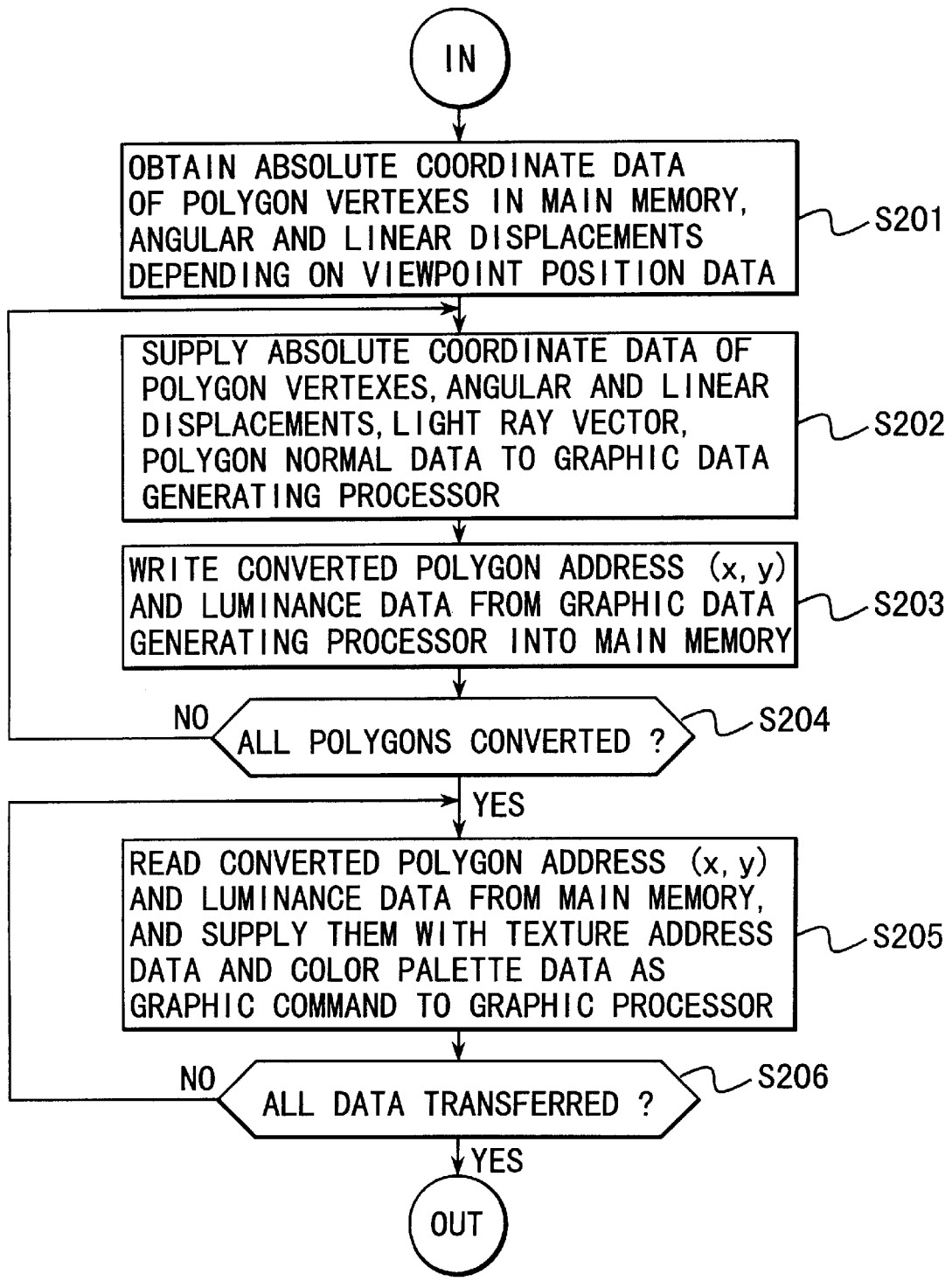
FIG. 11 is a flowchart of a control sequence of a field image display subroutine in the main routine shown in FIG. 8.

FIG. 11 shows a flowchart of a control sequence of the field image display subroutine in the step S200.

In a step S201, the field information managing means 1g reads from the table shown in FIG. 3C address data of absolute coordinate data of the vertexes of a polygon and data of angular and linear displacements in the main memory 5, depending on the value of the viewpoint position data.

In a step S202, the field information managing means 1g supplies the absolute coordinate data of the vertexes of the polygon and data of angular and linear displacements, read from the main memory 5, data of a vector of a light ray, and data of a normal to the polygon to the graphic data generating processor 3. Based on the supplied data, the graphic data generating processor 3 determines converted polygon address data (x, z) and luminance data, and supplies the determined data to the field information managing means 1g.

In a step S203, the field information managing means 1g writes the converted polygon address data (x, z) and the luminance data supplied from the graphic data generating processor 3 into the main memory 5.

In a step S204, the decision means 1c determines whether the absolute coordinate data of the vertexes of all polygons have been converted to polygon address data or not. If the absolute coordinate data of the vertexes of all polygons have been converted to polygon address data (YES), then control proceeds to a step S205. If not (NO), then control goes back to the step S202.

In the step S205, the graphic command issuing means 1e reads the converted polygon address data (x, z) and the luminance data from the main memory 5, and supplies the converted polygon address data (x, z) and the luminance data, together with texture address data and color palette data, as a graphic command to the graphic processor 10. Based on the converted polygon address data (x, z), the graphic processor 10 writes the texture data of a game field into the display area of the buffer 11. Therefore, the display screen of the television monitor 12 displays an image of a game field which comprises a number of polygons.

In a next step S206, the decision means 1c determines whether all the data have been transferred or not. If all the data have been transferred (YES), then control leaves the field image display subroutine. If not (NO), then control goes back to the step S205.

Figure 12:
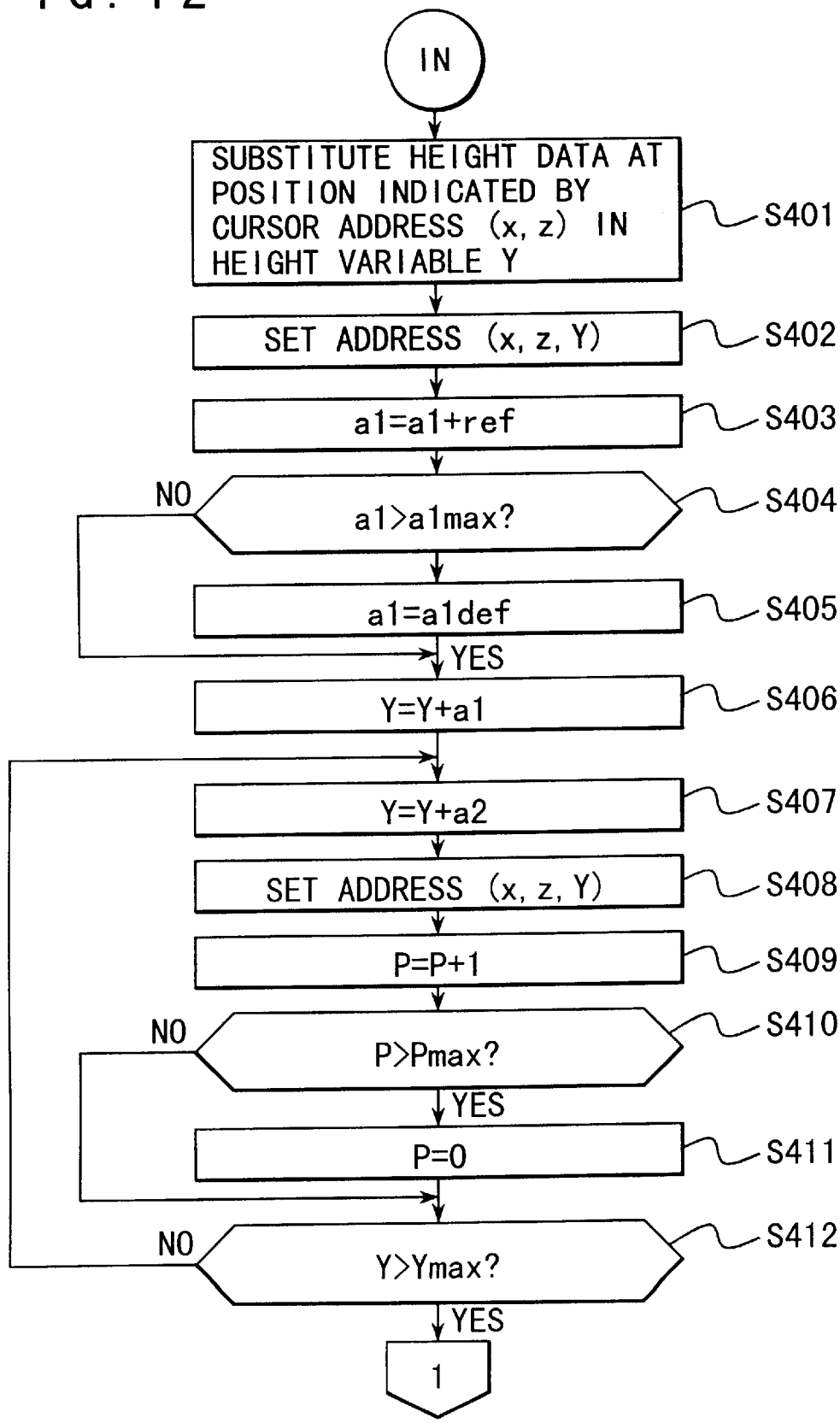
FIGS. 12 and 13 are flowcharts of a control sequence of a cursor image display subroutine in the main routine shown in FIG. 8.
Figure 13:
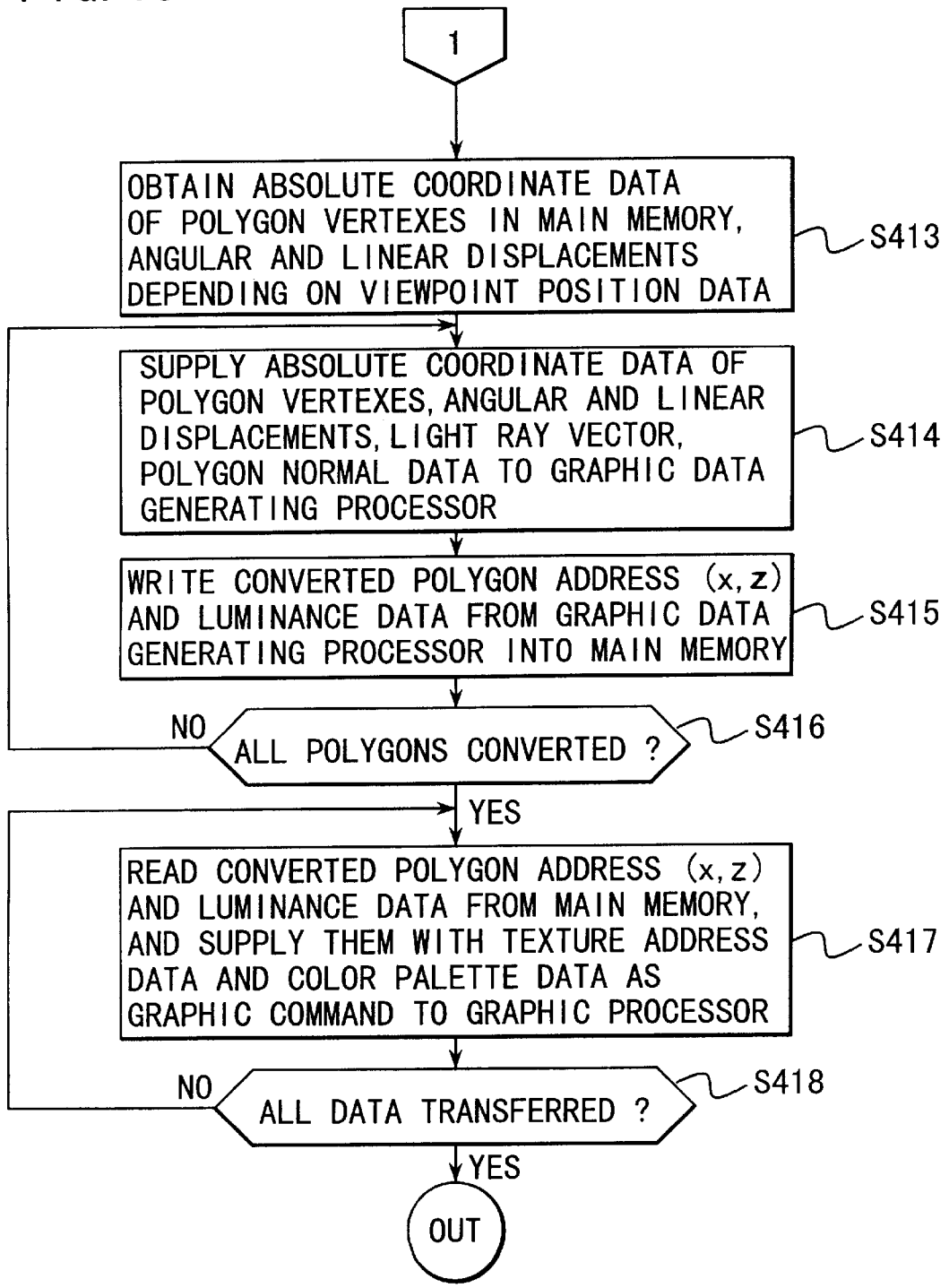

FIGS. 12 and 13 show flowcharts of a control sequence of the cursor image display subroutine in the step S400 shown in FIG. 8.

In a step S401 (FIG. 12), the cursor information managing means 1i reads the cursor address data (x, z) stored in the cursor address storage area in the main memory 5, and also reads height data y at a position indicated by the cursor address data (x, z) from the table. Then, the variable setting means 1d substitutes the height data y in a height variable Y.

In a step S402, the cursor information managing means 1i stores an address (x, z, Y) in an address setting area in the main memory 5.

In a step S403, the calculating means 1b adds a reference value ref to a variable a1. The variable a1 is a variable for shifting the display positions of a number of semitransparent cursors for respective frames. The variable a1 has its value made progressively greater for the respective frames. When the value of the variable a1 becomes greater than a maximum value a1max, it is set to a minimum value a1def.

In a step S404, the decision means 1c determines whether the variable a1 is greater than the maximum value a1max or not. If the variable a1 is greater than the maximum value a1max (YES), then control goes to a step S405. If not (NO), then control jumps to a step S406.

In the step S405, the variable setting means 1d substitutes the minimum value a1def in the variable a2.

In the step S406, the calculating means 1b adds the variable a1 to the height variable Y.

In a step S407, the calculating means 1b adds a variable a2 to the height variable Y. The variable a1 serves to display a number of cursors on the same address (x, z).

In a step S408, the cursor information managing means 1i stores addresses (x, z, Y) in the address setting area in the main memory 5. There are as many addresses (x, z, Y) as the number of values that the height variable Y can take. The values that the height variable Y can take range from a minimum value to a maximum value Ymax in steps each equal to the variable a2.

In a step S409, the calculating means 1b adds "1" to image number data P. The image number data P serves to select a cursor image. In the illustrated embodiment, there are available a plurality of cursor images of different patterns for making the cursor appear to the game player to move from the left to the right or from the right to the left in itself. When the value of the image number data P exceeds a maximum value Pmax, it is reset to "0," and thereafter incremented for each frame. Therefore, different image number data P are obtained for the respective frames, and cursor images are selected by the image number data P. As a result, the cursor appears to the game player to move from the left to the right or from the right to the left in itself.

In a step S410, the decision means 1c determines whether the value of the image number data P exceeds the maximum value Pmax or not. If the value of the image number data P exceeds the maximum value Pmax (YES), then control goes to a step S411. If not (NO), then control jumps to a step S412.

In the step S411, the variable setting means 1d substitutes "0" in the image number data P.

In the step S412, the decision means 1c determines whether the value of the height variable Y is greater than the maximum value Ymax or not. If the value of the height variable Y is greater than the maximum value Ymax (YES), then control goes to a step S413. If not (NO), then control returns to the step S407.

In the step S413, the cursor information managing means 1i reads from the table shown in FIG. 3C address data of absolute coordinate data of the vertexes of a polygon and data of angular and linear displacements in the main memory 5, depending on the value of the viewpoint position data.

In a step S414, the cursor information managing means 1i supplies the absolute coordinate data of the vertexes of the polygon and data of angular and linear displacements, read from the main memory 5, data of a vector of a light ray, and data of a normal to the polygon to the graphic data generating processor 3. Based on the supplied data, the graphic data generating processor 3 determines converted polygon address data (x, z) and luminance data, and supplies the determined data to the cursor information managing means 1i.

In a step S415, the cursor information managing means 1i writes the converted polygon address data (x, z) and the luminance data supplied from the graphic data generating processor 3 into the main memory 5.

In a step S416, the decision means 1c determines whether the absolute coordinate data of the vertexes of all polygons have been converted to polygon address data or not. If the absolute coordinate data of the vertexes of all polygons have been converted to polygon address data (YES), then control proceeds to a step S417. If not (NO), then control goes back to the step S414.

In the step S417, the graphic command issuing means 1e reads the converted polygon address data (x, z) and the luminance data from the main memory 5, and supplies the converted polygon address data (x, z) and the luminance data, together with texture address data and color palette data, as a graphic command to the graphic processor 10. Based on the converted polygon address data (x, z), the graphic processor 10 writes the texture data of a game field into the display area of the buffer 11. Therefore, the display screen of the television monitor 12 displays an image of a cursor which comprises a number of polygons.

In a next step S417, the decision means 1c determines whether all the data have been transferred or not. If all the data have been transferred (YES), then control leaves the cursor image display subroutine. If not (NO), then control goes back to the step S417.

In the above embodiment, a game field is displayed as polygons, and a cursor displayed in the game field for selecting a game character is associated with cursor images in the form of a vertical array on the game field. Therefore, even when the cursor is positioned behind and concealed by a bump in the game field, the position of the cursor can be recognized from the vertical array of cursor images.

Since the cursor is displayed as a polygon, it matches the game field, providing a more comfortable game space to the game player.

All the cursor images other than the basic cursor image in the lowermost position are semitransparent. Therefore, any game field details superposed by the semitransparent cursor images are not concealed from view, giving the game player a more comfortable game environment.

The cursor images are different from each other for respective frames. Thus, the cursor can visually be perceived as if rotating in itself. The cursor is therefore highly visually recognizable and distinguishable from the image of the game field. This is also effective to give the game player a more comfortable game environment.

Since the position of the viewpoint with respect to the game field and the cursor can be changed with the first left button 22L1, the second left button 22L2, the first right button 22R1, and the second right button 22R2, the cursor can easily be moved within the game field.

While the cursor is lozenged in shape (square-shaped when viewed in plan) in the illustrated embodiment, it may be circular, triangular, or pentagonal in shape. The cursor may be red or yellow in color rather than white.

The position of the viewpoint may be changed depending on the position of the cursor. Specifically, a certain height is used as a reference, and if the height of the game field at the position of the cursor is greater than the reference height, then the position of the viewpoint may be increased by the difference between the height of the game field and the reference height, and if the height of the game field at the position of the cursor is smaller than the reference height, then the position of the viewpoint may be reduced by the difference between the height of the game field and the reference height. To carry out this process, a step of determining the height data retained in the step S14 (see FIG. 9) and the reference height data may be added after the step S14, and, in the step S16, the difference data may be subtracted from the height data of the position of the viewpoint if the difference is positive, and the difference data may be added to the height data of the position of the viewpoint if the difference is negative. This process allows the game player to have a more realistic feeling in playing the video game because the viewpoint in the vertical direction with respect to the game field is changed each time the cursor is moved.

Although a certain preferred embodiment of the present invention has been shown and described in detail, it should be understood that various changes and modifications may be made therein without departing from the scope of the appended claims.

What is claimed is:

1. A method of displaying a cursor on a display, comprising the steps of:
    displaying a three-dimensional environment;
    displaying in a frame a plurality of cursor images three-dimensionally depicted in a vertical array in the three-dimensional environment; and
    altering a position of said vertical array of said cursor images in a subsequent frame in response to a user input so as to provide continuous user controlled movement of said vertical array of said cursor images in the three-dimensional environment to effect cursor operation.

2. A method according to claim 1, further comprising the steps of:
    preparing a plurality of different types of cursor images for each of said cursor images; and
    displaying said different types of cursor images cyclically in subsequent display frames for each of said cursor images.

3. A method according to claim 1, further comprising the step of changing positions where at least selected ones of the cursor images are displayed, in every predetermined period of time of each subsequent frame.

4. A method according to claim 1, further comprising the steps of:
    altering a viewpoint of the three-dimensional environment; and
    changing said cursor images in shape to reflect the alteration of the view point.

5. A method according to claim 1, further comprising the step of displaying at least selected ones of said cursor images semitransparent.

6. A method of displaying a cursor on a display, comprising the steps of:
    displaying a three-dimensional environment;
    setting a three-dimensional coordinate value of a selected position in the three-dimensional environment;
    setting a plurality of three-dimensional coordinate values based on said three-dimensional coordinate value such that the plurality of three-dimensional coordinate values have a predetermined spatial relationship to said three-dimensional coordinate value of said selected position;
    obtaining two-dimensional coordinate values from the three-dimensional coordinate values for generating graphic command image data for displaying in a frame a plurality of cursor images three-dimensionally in the three-dimensional environment at positions corresponding to the three-dimensional coordinate values; and altering said selected position of said three-dimensional coordinate value for a subsequent frame in response to a user input so as to provide continuous user controlled movement of said cursor images in said predetermined spatial relationship in the three-dimensional environment to effect cursor operation.

7. A method according to claim 6, wherein said step of setting a plurality of three-dimensional coordinate values comprises the steps of:

adding a value to one coordinate value of said three-dimensional coordinate values;

setting the three-dimensional coordinate values with said value added thereto; and continuously adding the value to said one of said three-dimensional coordinate values until said one coordinate value of said three-dimensional coordinate values exceeds a reference value.

8. A method according to claim 7, further comprising the steps of:

preparing a plurality of different types of cursor images for each of said cursor images; and obtaining cursor image number data to select one of said different types of cursor images for in subsequent frames.

9. A method according to claim 6, further comprising the step of generating image data for displaying at least selected ones of said cursor images semitransparently.

10. A method according to claim 7, further comprising the step of prior to the step of adding a value to said one coordinate value of said three-dimensional coordinate values, adding a cyclically variable value to said one coordinate value of said three-dimensional coordinate values in every predetermined period of time.

11. A method according to claim 6, further comprising the steps of:

altering a viewpoint of the three-dimensional environment; and changing said cursor images in shape to reflect the alteration of the view point.

12. The method of claim 2 wherein said plurality of different types of cursor images correspond to views of said cursor images rotated differing degrees such that said cursor images appear to rotate with display of subsequent frames.

13. The method according to claim 3, wherein the step of changing positions where at least selected ones of the cursor images are displayed, in every predetermined period of time of each subsequent frame, includes vertically incrementing said positions so as to depict continuous vertical movement.

14. The method according to claim 13, wherein said vertical movement is upward.

15. The method according to claim 13, wherein:

said vertical movement is upward;

said three dimensional environment includes a field surface; and said at least selected ones of said cursor images exclude one of said cursor images and said one of said cursor images remains displayed at a level of said field surface.

16. The method according to claim 3, wherein said predetermined spatial relationship is a vector.

17. The method according to claim 16, wherein said vector is vertically oriented.

18. The method of claim 8 wherein said plurality of different types of cursor images correspond to views of said cursor images rotated differing degrees such that said cursor images appear to rotate with display of subsequent frames.

* * * * *